United States Patent
Salmon et al.

(10) Patent No.: US 7,624,341 B2
(45) Date of Patent: Nov. 24, 2009

(54) SYSTEMS AND METHODS FOR SEARCHING AND DISPLAYING REPORTS

(75) Inventors: Janet Dorothy Salmon, Dudenhofen (DE); Guido Tesch, Karlsruhe (DE); Christoph Luebbe, Bruchsal (DE)

(73) Assignee: SAP AG, Walldorf (DE)

( * ) Notice: Subject to any disclaimer, the term of this patent is extended or adjusted under 35 U.S.C. 154(b) by 536 days.

(21) Appl. No.: 10/972,679

(22) Filed: Oct. 26, 2004

(65) Prior Publication Data

US 2005/0144554 A1 Jun. 30, 2005

Related U.S. Application Data

(60) Provisional application No. 60/514,900, filed on Oct. 29, 2003.

(51) Int. Cl.
*G06F 17/27* (2006.01)
(52) U.S. Cl. .................... 715/255; 715/229
(58) Field of Classification Search ............ 715/500, 715/511, 515, 517, 530, 200, 229, 209, 243, 715/255
See application file for complete search history.

(56) References Cited

U.S. PATENT DOCUMENTS

| | | | | |
|---|---|---|---|---|
| 5,603,025 A | * | 2/1997 | Tabb et al. ................. 707/2 |
| 5,608,904 A | * | 3/1997 | Chaudhuri et al. ............ 707/2 |
| 5,991,595 A | * | 11/1999 | Romano et al. ............ 434/353 |
| 6,035,297 A | * | 3/2000 | Van Huben et al. ............ 707/8 |
| 6,088,693 A | * | 7/2000 | Van Huben et al. ............ 707/8 |
| 6,094,654 A | * | 7/2000 | Van Huben et al. ............ 707/8 |
| 6,600,898 B1 | * | 7/2003 | De Bonet et al. .......... 455/3.04 |
| 6,609,096 B1 | * | 8/2003 | De Bonet et al. ............ 704/500 |
| 2002/0147655 A1 | * | 10/2002 | Say ........................ 705/26 |

* cited by examiner

*Primary Examiner*—Stephen S Hong
*Assistant Examiner*—Gregory J Vaughn
(74) *Attorney, Agent, or Firm*—Finnegan, Henderson, Farabow, Garrett & Dunner, LLP

(57) ABSTRACT

Systems and methods are provided for searching and displaying reports to a user. In one embodiment, the user selects an item from a displayed list of reporting objects. Based on the user's selection, a list of report topics available for the selected item is determined and presented to the user. In response, the user may select a report topic and, thereafter, the appropriate available report(s) may be directly presented or displayed to the user without any further user interaction. In one embodiment, an appropriate updated report may be generated in response to the user's selections. In another embodiment, the list of reporting topics is determined implicitly for the objects associated with the context the user is working in.

64 Claims, 10 Drawing Sheets

Cost Centers: actual/plan/variance

| Cost centers: actual/plan/variance | Date: 28.12.2003 | | Page: | 2 / | 4 |
|---|---|---|---|---|---|

| Cost Center/Group | 4500 | | | | |
| Person responsible: | Nunnemann | R & D | Column: | 1 / | 2 |
| Reporting period: | 1 to 12 2003 | | | | |

| Cost elements | Act costs | Plan costs | Abs. var | Var (%) |
|---|---|---|---|---|
| 415100 External Services | | 12.000,00 | 12.000,00- | 100,00- |
| 420000 Direct labor costs | | | | |
| 430000 Salaries | 135.607,89 | 188.174,16 | 52.566,27- | 27,93- |
| 435000 Annual Bonus | 11.458,65 | 15.681,04 | 4.222,39- | 26,93- |
| 440000 Legal social expens | | | | |
| 440100 Soc. secur., salary | 31.451,31 | 43.200,13 | 11.828,82- | 27,33- |
| 449000 Other pers. costs | 2.907,62 | 10.754,38 | 7.846,76- | 72,96- |
| 474100 Travel Exp. LSA | 4.548,50 | 6.259,20 | 1.710,70- | 27,33- |
| 476000 Office supplies | 9.789,21 | 13.561,44 | 3.772,23- | 27,82- |
| 476900 Miscellaneous costs | 2.259,11 | 3.129,60 | 870,49- | 27,81- |
| 481000 Cost-acctg deprec. | 3.346,00- | | 3.346,00- | |
| 618000 DAA IT Development | | 39.799,28 | 39.799,28- | 100,00- |
| 632000 IAA Corporate Serv. | 25.483,00 | 75.720,00 | 50.237,00- | 66,35- |
| 633000 IAA Canteen | 1.593,76 | 4.371,63 | 2.777,87- | 63,54- |
| 634000 IAA Telephone units | 1.679,98 | 2.377,66 | 697,68- | 29,34- |
| 635000 IAA Telephones | 3.332,76 | 4.698,60 | 1.365,84- | 29,07- |
| 637000 IAA Human Resources | 3.803,40 | 5.071,20 | 1.267,80- | 25,00- |
| * Debit | 230.569,19 | 424.878,32 | 194.309,13- | 45,73- |
| | | | | |
| 519000 DAA Production | | 344.457,86- | 344.457,86 | 100,00- |

Cost Centers: Actual/Plan/Variance: Selection    507

Selection values

| | |
|---|---|
| Controlling Area | 1000 |
| Fiscal Year | 2003 |
| From Period | 1 |
| To Period | 12 |
| Plan Version | 0 |
| Actual Valuation | ☐ |

540

Selection groups

| | | | |
|---|---|---|---|
| Cost Center Group | | to | |
| Or value(s) | 4500 | | |
| Cost Element Group | | to | |
| Or value(s) | 0 | | 900000 |

Fig. 5E

SYSTEMS AND METHODS FOR SEARCHING AND DISPLAYING REPORTS

CROSS-REFERENCE TO RELATED APPLICATION(S)

This application claims priority to U.S. Provisional Application No. 60/514,900, filed on Oct. 29, 2003, the disclosure of which is expressly incorporated herein by reference to its entirety.

BACKGROUND OF THE INVENTION

I. Field of the Invention

The present invention generally relates to data processing and to computer-implemented displays of information, such as reports. More particularly, the invention relates to systems and methods for searching, generating, and displaying reports, such as reports stored in a database that are selectable for viewing by a user.

II. Background Information

In information systems, there is a need to search and display stored information. For example, in Enterprise Resource Planning (ERP) systems and other planning systems, there is often a need to search and display reports. Reports may comprise any set of stored information, such as the results produced by running a query on one or more databases. Such information may itself be stored in a centralized database or other well-known storage environments (such as distributed database architectures).

Various types of reports are known. By way of example, reports may be financial reports generated for a particular period of time. A financial report may be generated for a particular business unit or may be a company-wide report. Other types of reports, such as inventory reports, cost reports, etc. may also be generated. In certain cases, reports may be generated on a periodic basis to monitor results or other information over specific time periods.

In corporations, business organizations and other environments, a large quantity of reports may be generated. Some of the reports may overlap, while other reports may be identical or similar in type. Further, similar reports may differ only with respect to one or more parameters (e.g., time of report, location, or area of interest, etc.). The relationships between reports are not always evident to the user and can be difficult to sort or determine when searching stored reports or seeking to update old reports.

Generating reports, especially in a large organization, may be very time consuming and resource intensive because the underlying data may be extremely voluminous (e.g., the price, model, options, and other details for each of fourteen million cars sold in a fiscal year) and may have to be downloaded from remote sites across slow network or other communications connections. Consequently, many organizations store reports for future reference so that they need not incur the costs of generating them again.

Basic search tools exist for locating stored reports, such as general-purpose computer or software-enabled search utilities that come with operating systems, such as Microsoft Windows™. For example, the Microsoft search utility allows a user to search for documents based on criteria or parameters such as a document's file name, file creation time, a word or phrase in the document, the document's storage location in the system, including remote location on a network, and the document's size. Such utilities, however, do not provide an efficient nor effective way to search for reports, particularly in environments where many reports are generated and stored, because they require the user to enter specific details and information about the sought-after report, such as listed above. A user, especially one inexperienced at finding the desired report, will typically not have the necessary detailed information to find the desired report, especially if reports are distributed at different locations across a networked system and maintained by different personnel using different naming conventions, formats, etc. Further, if a user searches with generalized information, conventional search utilities will find an excessive number of reports and other extraneous documents, which the user will have to individually consider to filter out the irrelevant set.

Accordingly, there is a need for improved systems and methods for searching, generating, and displaying reports. Furthermore, there is a need for improved search systems and methods for permitting a user to search and identify relevant reports in an efficient and effective manner. Current solutions do not sufficiently address these needs nor address other problems that exist in the art.

SUMMARY OF THE INVENTION

Consistent with embodiments of the present invention, systems and methods are provided for searching, generating, and displaying reports.

Consistent with the invention, systems and methods may be provided for permitting a user to search and display reports. In one exemplary method, the user selects an item from a list of reporting objects. Based on the user's selection, a list of report topics available for the selected item are determined and presented to the user. In response, the user may select a report topic and, thereafter, the appropriate report(s) may be directly presented or displayed to the user without any further user interaction.

Consistent with the invention, systems, methods, and computer programs may further be provided for displaying a list of objects, receiving a selection of at least one object from the displayed list of objects, determining, based on the selected object, a list of report topics available for the selected object, displaying the list of report topics, receiving a selection of at least one report topic from the displayed list of report topics, determining, based on the selected object and the selected report topic, an appropriate report from among a plurality of reports, and displaying the appropriate report to the user.

Consistent with the invention, systems, methods, and computer programs may further be provided for displaying a list of objects, receiving a selection of at least one object from the displayed list of objects, determining, based on the selected object, a list of report topics available for the selected object, displaying the list of report topics, receiving a selection of at least one report topic from the displayed list of report topics, determining, based on the selected object and the selected report topic, an appropriate report from among a plurality of reports, determining a set of parameters used to generate the appropriate report, generating a new report based on the set of parameters, and displaying the new report to the user.

Consistent with the invention, systems may further still be provided comprising a transmitter for sending signals containing information for displaying a list of objects, for displaying a list of report topics, and for displaying an appropriate report, a receiver for receiving signals containing information regarding an object selected by a user from the list of objects and a report topic selected by the user from the list of report topics; at least one data storage device containing a plurality of reports, and a processor, connected to the transmitter, the receiver, and the at least one data storage device, for determining the list of objects, for determining, based on the object selected by a user, the list of report topics, and for determining, based on the object selected by the user and the report topic selected by the user, the appropriate report from the plurality of reports.

Consistent with the invention, systems and methods may further still be provided for receiving a report topic for an object, determining a report related to the report topic for the object, determining a plurality of parameters used to generate the report, generating a new report using the plurality of parameters, and presenting the new report to the user.

It is to be understood that both the foregoing general description and the following detailed description are exemplary and explanatory only, and should not be considered restrictive of the scope of the invention. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIGS. 5A-5E illustrates exemplary user-interface screens and an exemplary method for searching and displaying reports, consistent with an embodiment of the invention.

DETAILED DESCRIPTION

Figure 1:
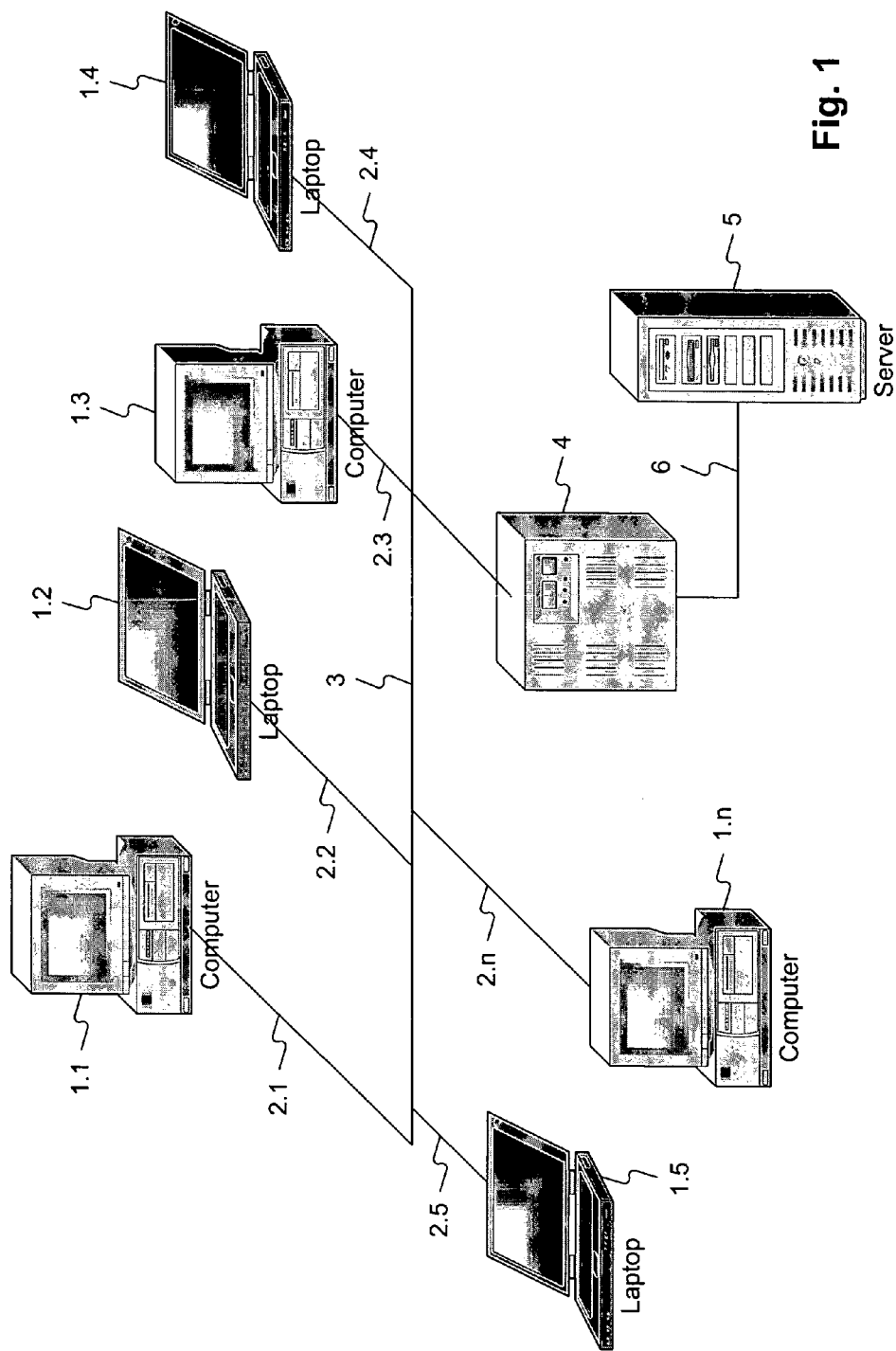
FIG. 1 illustrates an exemplary system environment for implementing embodiments of the invention.

The following detailed description refers to the accompanying drawings. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention.

Embodiments of the present invention are directed to systems and methods for searching and displaying reports. The invention may be implemented in various embodiments, including computer-based environments, such as personal computers, workstations, servers, and laptops, as well as personal digital assistants (PDAs), mobile phones, handheld devices, and other computing devices.

With reference to FIG. 1, an exemplary computer-based environment is illustrated which may be used for implementing embodiments of the invention. As shown, a multi-node-communication device 4, such a router, switch, or the like, is communicatively connected to and/or manages a network 3. One or more user devices, 1.1, 1.2, . . . 1.n, such as desktop computer 1.1 and laptop computer 1.2, are communicatively connected to network 3 via interfaces 2.1, 2.2, . . . 2.n. These interfaces may comprise, for example, an Ethernet™ or other wired interface, Bluetooth™ or other wireless interface, or SONET or other optical interface, among others. Also connected to network 3 is a server 5, such as a database server. The server may have a direct interface 6 to multi-node-communication device 4, as shown, or it may communicate through another interface (not shown) to network 3.

In one embodiment consistent with the invention, server 5 stores reports and other information for access by user devices 1.1 through 1.n via network 3 and multi-node-communication device 4. In another embodiment, any of user devices 1.1 through 1.n store reports and information, instead of, or in addition to, server 5, where the reports and information are accessible by user devices 1.1 through 1.n via network 3 and multi-node-communication device 4.

Figure 2:
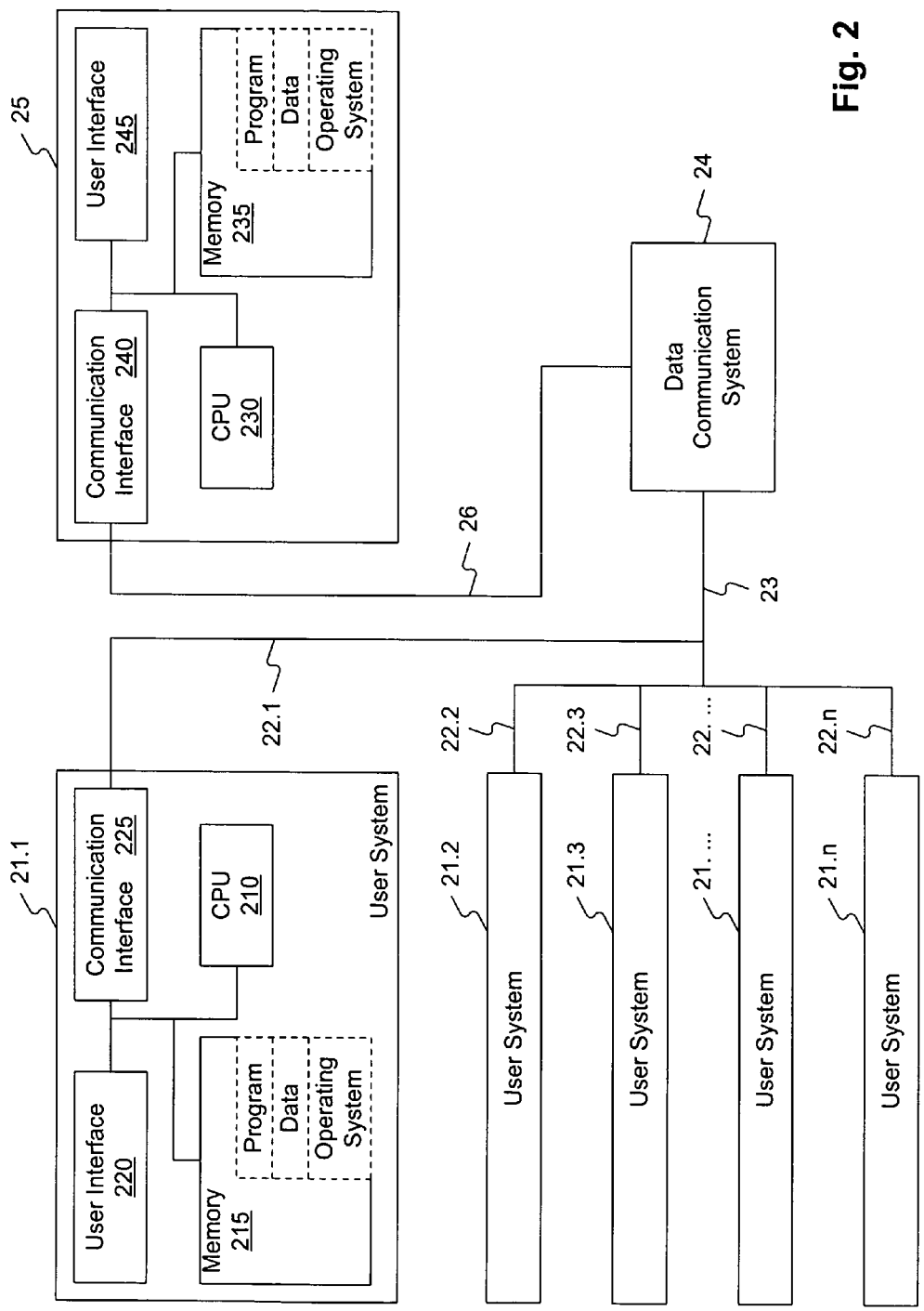
FIG. 2 illustrates another exemplary system environment for implementing embodiments of the invention.

FIG. 2 illustrates another exemplary system environment for implementing embodiments of the invention. As shown, a data communication system 24, such router(s), switch(es), or the like, is communicatively connected to and/or manages a network 23. One or more user systems 21.1, 21.2, . . . 21.n are communicatively connected to network 23 via interfaces 22.1, 22.2, . . . 22.n, such as an Ethernet™ or other wired interface, Bluetooth™ or other wireless interface, or SONET or other optical interface, among others. In one embodiment, a user system 21.1 is a computing device including a CPU 210 connected to a memory 215, a user interface 220, and a communication interface 225. Memory 225 may contain, for example, programs, data, and an operating system.

As further shown in FIG. 2, also connected to data communication system 24 via an interface 26, is a computing device 25, such as an ERP server, database server, or the like. In one embodiment, computing device 25 may include a CPU 230 connected to a memory 235, a user interface 245, and a communication interface 240. Memory 235 may contain programs, data, and an operating system.

Consistent with an aspect of the invention, computing device 25 may store reports and other information for access by user systems 21.1 through 21.n via network 23 and data communication system 24. In another embodiment, any of user devices 21.1 through 21.n may store reports or other information, instead of, or in addition to, computing device 25, where the reports and information are accessible by other user devices communicatively connected to network 23 and data communication system 24.

Figure 3:
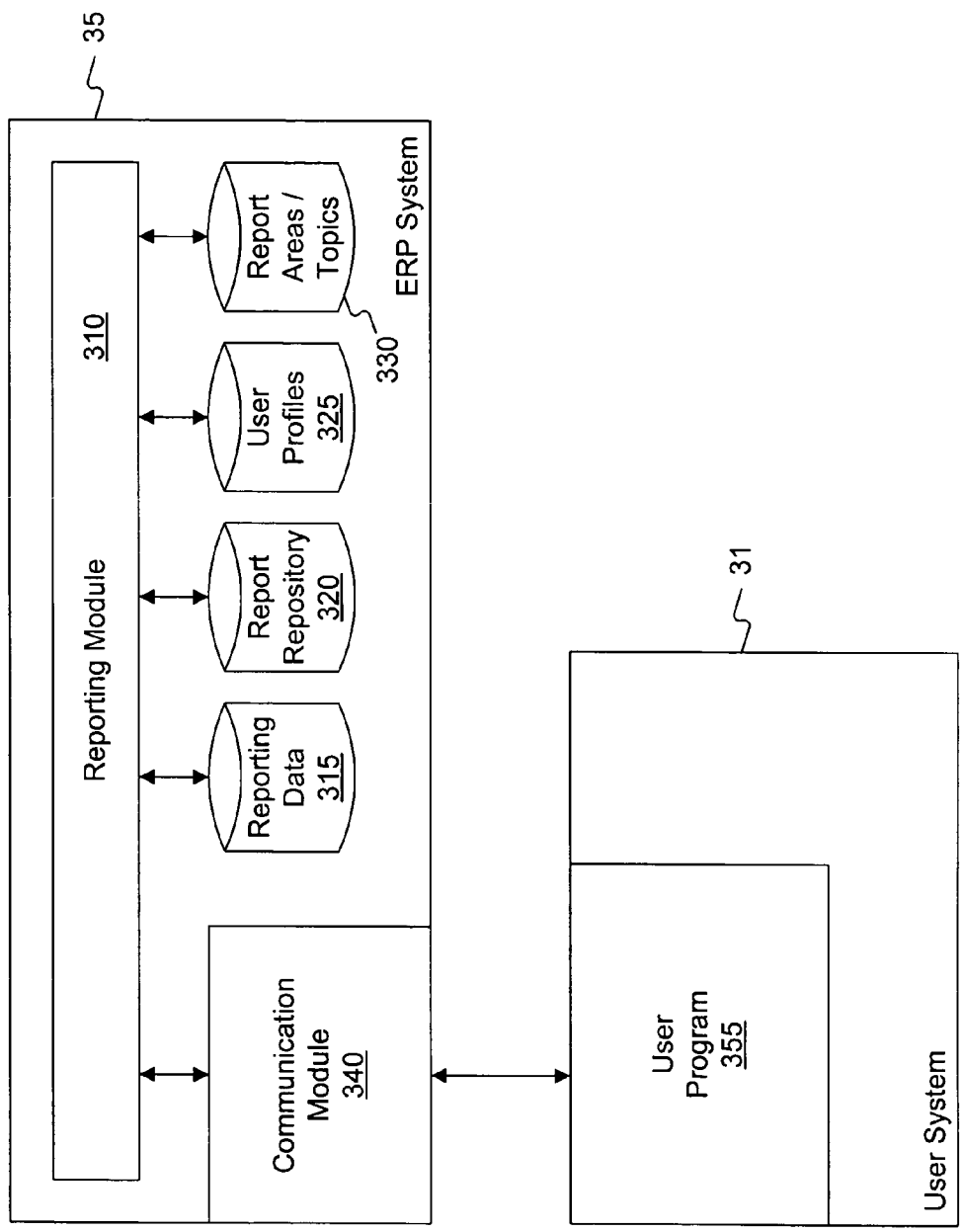
FIG. 3 illustrates an exemplary ERP system environment, with a reporting module and a user program, for searching and selecting stored reports, consistent with an embodiment of the present invention.

In accordance with another embodiment, FIG. 3 illustrates an exemplary ERP system environment, with a reporting module and a user program, for searching and selecting stored reports. Reporting systems consistent with the invention may be implemented as part of an information system, such as the ERP system 35 shown, or some other type of planning system. As shown, ERP system 35 includes reporting data 315; report repository 320, user profiles 325, and report areas/topics 330. Reporting data 315 may include, for example, data related to or included with reports. In one embodiment, reporting data may comprise data that indicates the date of a report (e.g., a reporting period) or the validity of a report. Reporting data may also include data indicating what report area(s) or topic(s) a report relates to, base data for the reports, tables for cost center accounting applications, tables for profit center accounting applications, and copies of the data in memory or a business warehouse (BW). Report repository 320 may include, for example, the stored reports and/or the results of queries previously run on a user's or enterprise's database(s), list(s) of existing reports in an ERP system core component, a business information warehouse, and external reporting application(s). User profiles 325 may include, for example, information about users, organizational unit(s) for which the user is responsible, cost center(s) for which the user is responsible, profit center(s) for which the user is responsible, default currency values, valuation methods, currencies, display preferences, such as display of thousands, etc. Report Areas/Topics 330 may include, for example, predefined categories for classifying stored reports and information for presentation to a user, such as plan/actual comparison by cost center group, balance sheet for profit center, income statement for segment, etc.

ERP systems 35 may also include a reporting module 310, which accesses the stored information in reporting data 315; report repository 320, user profiles 325, and report areas/topics 330 to facilitate the searching and display of reports and/or the generation of new or updated reports. For this purpose, reporting module 310 may be enabled to perform a search based on one or more parameters. These parameters may be entered by a user and/or based on stored information (such as a user's profile or applicable report areas/topics). Reporting module 310 may be connected to communication module 340, which handles communications with systems outside of ERP system 35. In the embodiment illustrated, communication module 340 communicates with user program 355 of user system 31, for example via a network such as network 23 shown in FIG. 2. In one embodiment, reporting module 310 is the customization layer between the portal (e.g., communications software) and reporting data 315; report repository 320, user profiles 325, and report areas/topics 330, which creates the information for display of a specific report with contents on the user interface.

Using user program 355 of user system 31, a user may search for and display reports or other organized sets of information from ERP system 35, such as information contained in report repository 320 and/or reporting data 315. Through reporting module 310, the reports that interest the user may be presented on a computer screen or other suitable display or presentation device (not shown). Relevant reporting data (such as the date or validity of a selected report) may also be presented and displayed to a user. In one embodiment, reporting module 310 may generate a new or updated report if the stored report is invalid or outdated (see, for example, the exemplary method of FIG. 6).

One of ordinary skill will recognize that many suitable combinations of hardware, software and/or firmware may be used to implement embodiments of the invention. Further, it will be appreciated that the embodiments shown in FIGS. 1-3 are but examples of the many embodiments possible within the scope of the invention.

Reports may correspond to any set of stored information, such as the stored results of a query run on one or more databases or a newly generated query result. In addition, various types of reports exist depending on, among other things, the type of organization or entity the report concerns, the purpose the report was prepared for, the individual who designed the report, the sensitivity or confidentiality of the information in the report, the intended audience of the report, standard business practices, governmental or other regulatory agency requirements, etc. For example, report topics for a report area such as "Profit Center" may include: Income Statements, Balance Sheets, Statistical Key Figures, etc. By way of a further example, report topics for another report area such as "Cost Center" may include: Operating Expenses, Statistical Key Figures, etc. As will be appreciated by the skilled artisan, these are merely examples of report areas and topics that can be used in combination with embodiments of the invention. The exact types of reports used are not critical to the invention.

Embodiments consistent with the invention may simplify a user's task of choosing or generating the right report for a specific topic from among a variety of available reports. For example, typically, there is more than one report or variation of a report related to a specified topic available in a reporting system, and it is difficult for a user, especially an inexperienced user, to find or generate the correct report because it is difficult to determine the proper parameters, such as query parameters or search parameters, for generating or finding the report. Embodiments consistent with the invention allow a user to easily choose the proper report for a specific defined topic and determine the parameters needed to start the report, find the report, and/or generate an update by automatically determining the report-related parameters for a specific topic identified by a user.

Reports are typically assigned to, or associated with, a specific area, function, entity, etc. (e.g., different organizational units, such as different divisions, plants, or departments), and it is often difficult for a user, especially an inexperienced user, to realize or understand which topics are covered by reports for a specified area. Embodiments consistent with the invention may allow a user to easily determine the relevant report topics for a specific area, function, entity, and the like by presenting a list of relevant report topics available for an area, function, entity, etc. identified by the user.

A report typically shows valid data for a specific time interval only if certain data processing has already been successfully performed, such as at the close of a period, such as a fiscal quarter, but a user cannot easily determine whether a report's data are valid without having rather detailed knowledge of how and when the report was prepared. Embodiments consistent with the invention may allow a user to easily determine whether a report contains valid data by automatically providing an indication of such to the user (e.g., by analyzing the relevant reporting data).

Figure 4:
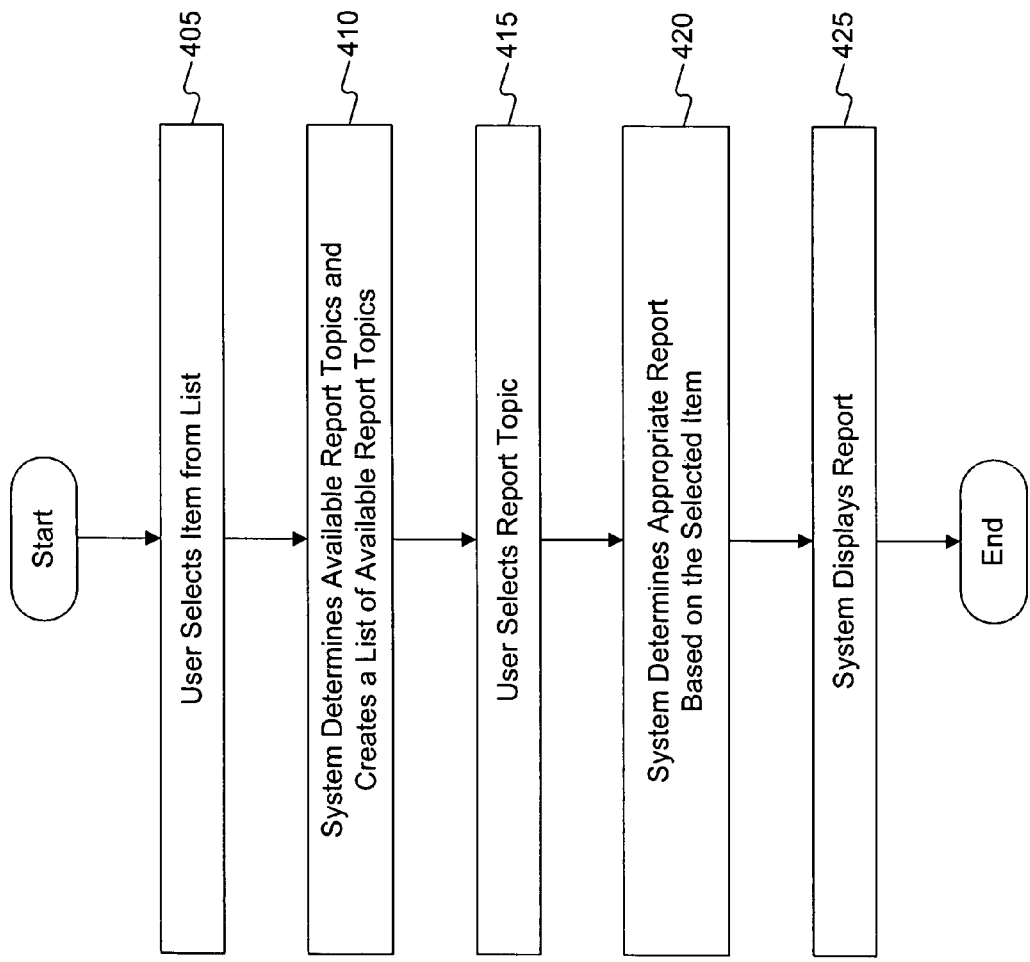
FIG. 4 is a flow chart of an exemplary method for searching and displaying reports, consistent with an embodiment of the invention.

FIG. 4 is a flow chart of an exemplary method for searching and displaying reports, consistent with an embodiment of the invention. The exemplary method may be implemented in software, hardware, or a combination of the two, running, for example, in a computing device 25 (see FIG. 2), such as an ERP server, database server, or the like. The exemplary method may also be implemented in other embodiments, such as those illustrated in FIGS. 1 and 3.

As illustrated in FIG. 4, the method may begin with the user selecting an item from a list of objects that have reports related to them (step 405). In one embodiment, the list may be generated by an application designed to presented to the user a hierarchical tree representing the structure of an organization or enterprise, such as a business or government entity. In another embodiment, the list is presented to the user as a graphical organizational chart representing the relationships between objects in an organization or enterprise. One of ordinary skill will recognize that the exact form, details, and presentation of the list are not critical to implementing embodiments of the invention, as long as they allow a user to select among objects that have associated reports.

In another embodiment, a user may select an object for the purpose of finding related report topics from whatever context or setting that the user happens to be in. For example, the user may be using a search engine, a database manager, or any other program that displays an explicit list of objects, and may select an object for which the user desires a list of report topics.

In yet another embodiment, the user does not explicitly select an object for which the user desires a list of report topics, but instead the object is defined implicitly by the context associated with the task the user is doing at a specific moment or by an event which triggers a user action. For example, if a manager receives a request to approve a business trip, this defines a context based upon which the system can provide appropriate report topics to help the manager to make the decision. In this example, the manager may simply click on a tool bar button or icon to notify the system that he or she wishes to find report topics associated with the request to approve the business trip, such as reports containing the travel budget compared to actual travel dollars spent, which would help the manager to decide if the travel budget allows for the requested trip. Another example of an implicit context is the group of the report topics used in the last week, which the system may use to determine and display a list of those topics.

In one embodiment consistent with the invention, the presentation associated with step 405 is accomplished through a browser window on a user's system, such as a user system 21.n in FIG. 2 or user system 31 in FIG. 3, that gets the list information from a program running on a network-accessible computer, such as computer 25 in FIG. 2 or ERP system 35 in FIG. 3. Selection of an item may by accomplished by highlighting and clicking with a mouse or by some other user interface device or method. Of course, this one example and the exact method and apparatus used for selecting are not critical.

Next, based on the user's selection, the system determines the available report topics for the selected item (or based on the context of the user's request for report topics) and creates a list of the available topics, Which is presented to the user (step 410). In one embodiment consistent with the invention, the system may perform one or more of the following operations to determine the available report topics: specifying the reporting area based on the type of the reporting object selected by the user; reading a list of reporting topics that are valid for this reporting area; checking whether there is a report available in the system for the specified report topic; and/or checking if an available report contains valid data. In some cases, a report may depend on the completion of other actions in the system, such as the close of a reporting period (e.g., a fiscal year), before the report contains valid data.

In an embodiment that reads a list of reporting topics which are valid for the user-selected reporting object or current user context, the system may classify each report associated with the object under one or more of the topics in a predefined list, such as income statements, balance sheets, cash flow statements, valuation measures, profitability, and management effectiveness, among others. According to this embodiment, the system may present only a populated subset of predefined topics to the user. One of ordinary skill will recognize that the exact predefined set of topics, the subdivisions, and the method of presentation of the list are not critical to the invention, as long as they present the topics to the user in an understandable manner and allow a user to select among topics that have reports available.

In one embodiment consistent with the invention, the presentation is accomplished through a browser window on a user's system, such as a user system 21.n in FIG. 2 or user system 31 in FIG. 3, that gets the topic list information from a program running on a network-accessible computer, such as computer 25 in FIG. 2 or ERP system 35 in FIG. 3.

In response to presentation of the list of available report topics, the user selects a report topic (step 415). The topic may be selected by positioning a cursor, by voice command processed by voice-recognition technology, or by some other user interface, many of which are known in the art. One of ordinary skill will recognize that the exact user interface used to select topics from a list is not critical to implementing embodiments of the invention. One of ordinary skill will also recognize that presentation in the form of a list is but one example. Topics may be presented in other forms without departing from the scope of the invention, for example, in a matrix or slideshow format.

Next, the system determines the appropriate report(s) that relate to the topic based at least on the user's topic selection (step 420). To make this determination, the system may perform one or more of the following operations: reading a list to determine which report should be started or searched for, wherein the list may be manually maintained by an administrator or dynamically created using information about the avalability of reports in the system; using the selected reporting topic and information from a user profile to determine the parameters for an appropriate report; and/or generating a new report so that the results may be displayed to the user.

In one embodiment that uses the selected reporting item and information from a user profile to determine the parameters for an appropriate report, the system may automatically fill in search parameters for a software application that searches through stored reports, and execute the software application. The system may fill in the search parameters based on, for example, the user's topic selection and/or the user's profile. The reporting module or search application may locate any reports that match the search parameters. According to this embodiment, the search application may search for reports stored on any system accessible to the search application. For example, the search application, such as a search utility included in reporting module 310 in FIG. 3, may search for reports on an ERP system, for example in report repository 320 of ERP system 35 as shown in FIG. 3. As another example, the search application may search for reports stored on user systems, such as user systems 21.1 through 21.n in FIG. 2, or for reports stored on any system connected directly or indirectly to a network, such as network 23 in FIG. 2.

In one embodiment, the system may use one of many conventional methods for searching the available reports to determine the appropriate report(s) to present to the user. For example, the system may use a file search engine, a database manager, a custom search application, or a combination of search technologies. The system provides the search parameters needed by the search technology to find appropriate reports. For example, the system may provide as parameters a character string to a text search engine, a structured query language (SQL) query to a database manager, or a tag-based query to a search engine that searches databases as well as document files and/or other files in which content is identified by tags associated with the data or file.

In one embodiment, the system uses a predefined set of search parameters for each selectable combination of objects and report topics as input to a search engine.

In one embodiment, user profiles are stored in a server or ERP system, such as user profiles 325 on ERP system 35 as shown in FIG. 3. A user profile may contain information such as the user's title, the user's data access privileges, the user's location, the user's preferred currency display, data for exclusion of certain account groups or cost elements, formatting for displayed data, such as display of display of thousands or display of revenues as +/−, etc. This information may be used to automatically form report search, generation, and display parameters such as language, currency units, sensitive data display permission, accounting method, etc. In one embodiment, the user profile may be used to determine the unique type(s) of reports or the data available in selected reports that are presented to the user. For example, for two different users that select the same object and report topic, the system may find or generate a German language report, with Euro-denominated amounts, using European accounting methods, and including confidential sales figures for all departments in the case of a user whose profile indicates that he/she is located in Germany, prefers amounts to be expressed in Euros, and is a vice president with privileges to access confidential sales figures. In contrast, the system may find or generate an English language report, with dollar-denominated amount, using American accounting methods, without confidential sales figures other than the user's sales figures in the case of a user whose profile indicates that he/she is located in the United States, prefers amounts to be expressed in dollars, and is a regional sales person with privileges to access only his/her own sales figures. In another embodiment consistent with the invention, user profiles are not used to form report search parameters.

After the system determines the appropriate report(s) that are related to the user's selections, the system displays the report(s) (step 425). In one embodiment, a report is displayed in a browser window on the requesting user's system, such as computer 1.1 or laptop 1.2 shown in FIG. 1. In another embodiment, a report is displayed by starting on the user's system an appropriate software application, such as a word processor or spreadsheet application, that displays the report information in its native format. One of ordinary skill will recognize that the exact method and apparatus used to display the appropriate report(s) to the user are not critical to implementing embodiments of the invention.

One of ordinary skill will also recognize that the methods for searching and displaying reports shown in FIG. 4 may be implemented with software and hardware in many other configurations in addition to the exemplary multi-user systems shown in FIGS. 1 and 2 and the exemplary single-user system shown in FIG. 3.

FIGS. 5A-5E illustrate exemplary user-interface screens and an exemplary method for searching and displaying reports, consistent with an embodiment of the invention. Graphical user interfaces or display screens may be presented to a user on, for example, a desktop computer 2.1 or laptop computer 1.2 as shown in FIG. 1, a user system 21.1-21.n as shown in FIG. 2, or a user system 31 as shown In FIG. 3. Such screens may be implemented with a browser application, as is well known in the art, that accesses information from a data source system, such as a server 5 as shown in FIG. 1, a computing device 25 as shown in FIG. 2, or an ERP system 35 as shown in FIG. 3.

Figure 5A:
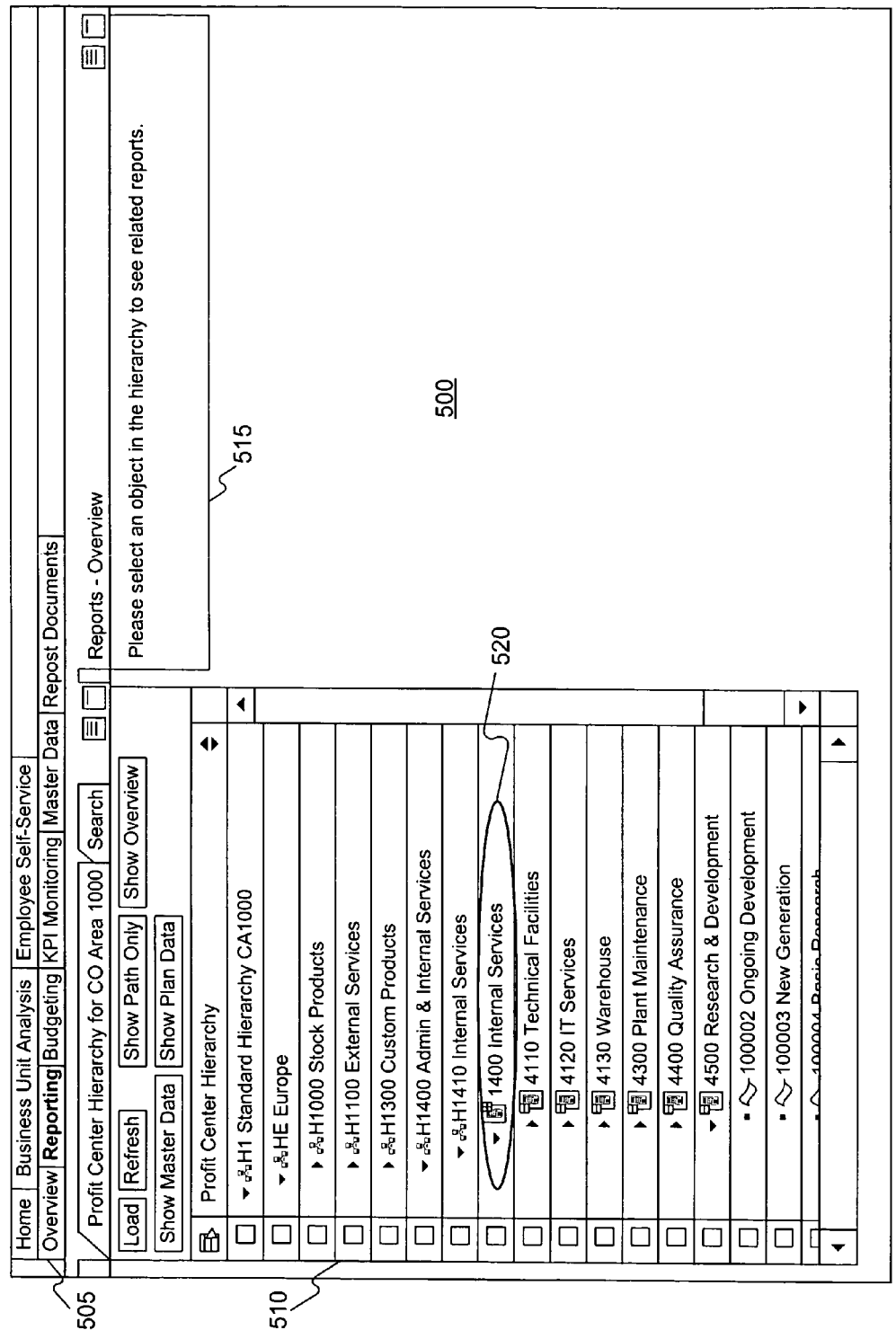

In the embodiment represented by FIG. 5A, a user is presented with a display 500 that allows the user to begin a process of searching for and displaying reports. As shown, the user may initiate the process by selecting a tab labeled "Reporting" from a row of tabs 505, which causes a list of objects 510 to be displayed. In this case, the list is formatted in a hierarchical fashion, although as noted above, the exact format of the display of objects is not critical to implementing embodiments of the invention. A work area of the display 500 to the right of the list 510 may be used to provide instructions or prompts 515 to the user. The user may select an object from the list 510, such as the object labeled "1400 Internal Services" 520 from the "Profit Center Hierarchy," using a conventional user-interface method and apparatus, many of which are well known in the art. The items in the presented list 510 may represent different objects (e.g., different organizational units of a company, different products or services of a company related to an organizational type or area, such as a profit center or cost center, etc.) for which the system is able to find or generate reports or other information.

As noted above, in another embodiment consistent with the invention, the user may initiate presentation of available relevant report topics from any context that he or she happens to be in, such as reading email, considering appointment book requests, working in a database or spreadsheet program, editing an address book, or drafting a letter to a customer, among others. In this embodiment, the system determines relevant report topics to display based on the user's current context. For example, if the user is drafting a letter to a customer, the system may generate a list of report topics for reports that are related to that customer.

Figure 5B:
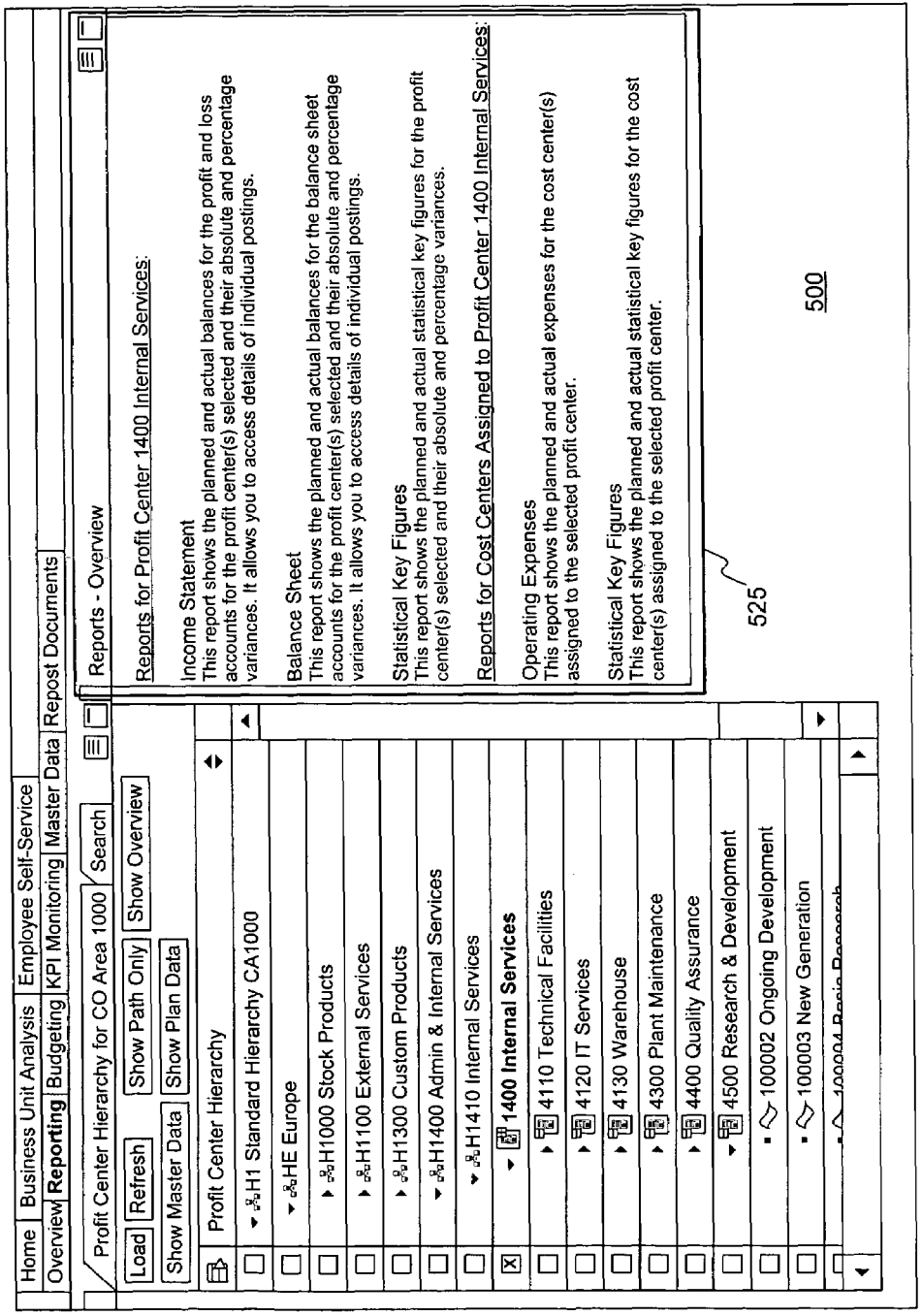

As shown in FIG. 5B, after an item is selected from list 510, (or determined from the user's context) a list of report topics 525 available for the selected object (in this case object 520 from FIG. 5A) may be presented to the user. As noted above, the available report topics that populate list 525 may be determined dynamically by the system (based on user inputs (e.g., the object selected), data availability, etc.), determined from a static list of topics or other static information, or determined by a combination of dynamic processing and static information.

Figure 5C:
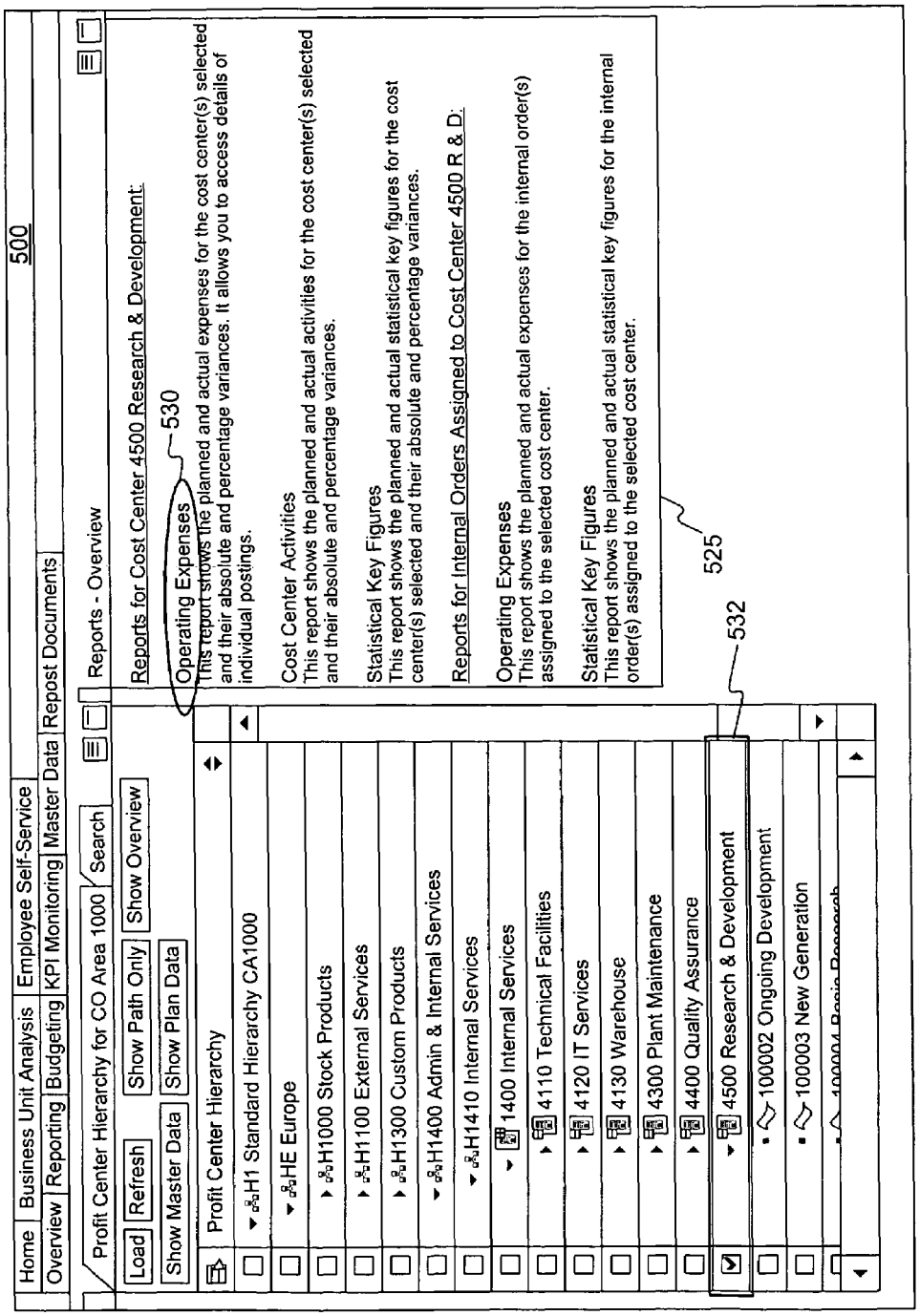

As shown in FIG. 5C, the user may select a specific report topic for which he or she seeks reports from the displayed list of topics 525, such as Operating Expenses 530 for the research and development cost center 532. As explained above, after the user chooses a report topic, the system may find, start, or otherwise determine any appropriate report(s) that correspond to the user's selection.

As shown in FIG. 5D, the system may then present to the user the appropriate report 535 for the selected report topic. In one embodiment consistent with the invention, a new window 506 is opened to display the appropriate report. If more than one report is appropriate, the system may open multiple, cascaded windows, one for each report, or may use tabs in a single window so that the user may choose one report at a time to display. Other embodiments may use other conventional methods and apparatus to present more than one report to the user.

In one embodiment consistent with the invention, the presentation of report 535 may be customized based on a user profile of the system user. For example, some of the report data may be omitted, such as confidential or sensitive data (e.g., salary data), if the user's profile indicates that the user does not have an access privilege for such data.

As shown in FIG. 5E, in one embodiment consistent with the invention, the system may further provide the user with a display 507 of parameters 540. The parameters may comprise starting parameters used by the system to find or generate appropriate reports. As explained above, the system may automatically determine or generate these parameters based on at least the objects and report topics selected by the user, though some embodiments may use additional information to determine or generate the parameters 540. Thus, the user does not have to know the details of the parameters 540, manually enter them into the system, or know the storage location of a report among a network of computers, in order to find or generate appropriate reports concerning a desired object and topic. In one embodiment consistent with the invention, the user may change the parameters 540 on display 507 and find or generate a new report using the changed parameters.

Although many of the embodiment above are described in terms of searching for previously generated reports that match the user's selections, the invention is not so limited. Systems and methods consistent with the invention may also generate new reports based on a user's selections.

Figure 6:
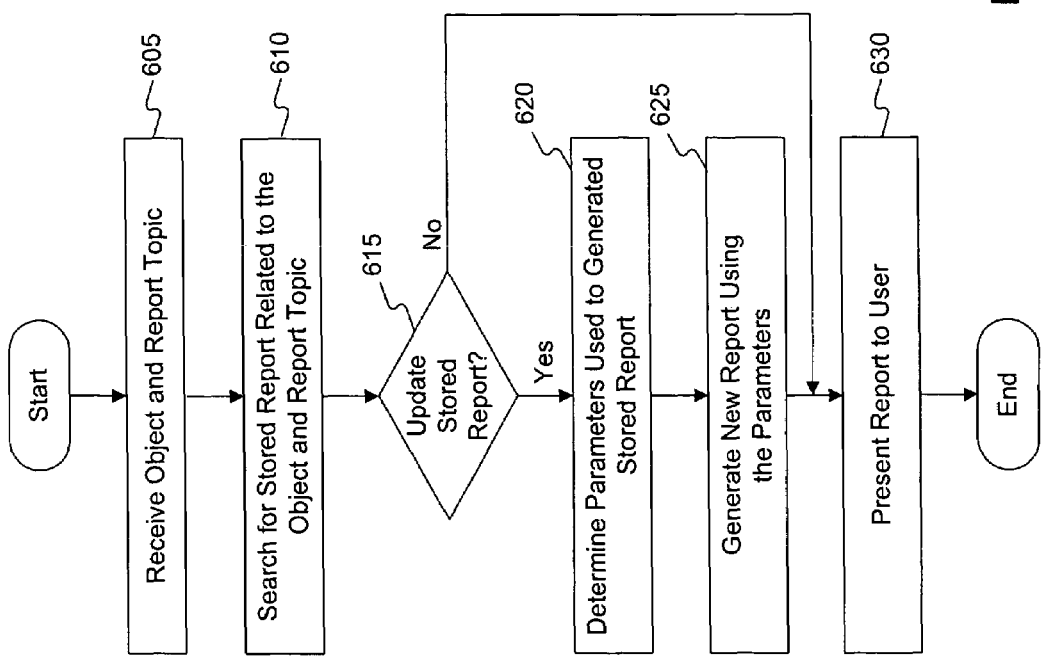
FIG. 6 is a flowchart depicting an exemplary process for determining an appropriate report, consistent with an embodiment of the invention.

FIG. 6 is a flowchart depicting an exemplary process for determining an appropriate report, consistent with another embodiment of the invention. The process may be implemented in software, hardware, or a combination of the two, running, for example, in a computing device 25 (see FIG. 2), such as an ERP server, database server, or the like. The exemplary method may also be implemented in other embodiments, such as those illustrated in FIGS. 1 and 3. In particular, the exemplary method may be implemented using ERP system 35 and reporting module 310 of the example of FIG. 3.

As illustrated in FIG. 6, the process begins by receiving an object and a report topic (step 605). In one embodiment, the received object and report topic are based on selection(s) made by a user, for example, as described above with respect to FIGS. 4 and 5. In another embodiment, the object and associated report topic are determined implicitly by the context that the user is working in.

The process next searches for stored reports related to the received object and report topic (step 610). This operation may be performed by a search engine, database manager, file search application, or other application or combination of applications, depending on, among other things, how and where the reports are stored. Reports may be stored, for example, in a database or other organized collection of data, as word processing files, or as text files. Reports may be stored in a single computer or data storage device, or in multiple computers or data storage devices. In another embodiment, the process searches for stored report parameters that can be used to generate a report.

Next, the process determines whether to update the stored report (step 615). In one embodiment, this determination may be based on the age or reporting period for the stored report, user input, the current date, and/or a change in the data underlying the report. To make this determination, stored reporting data or other information may be analyzed.

If the stored report is not to be updated, (step 615, No), then the process presents the stored report to the user (step 630) and the process ends, as shown in FIG. 6.

If, on the other hand, the stored report is to be updated, (step 615, Yes), then the process determines the parameters used to generate the stored report (step 620). In one embodiment where the stored report is the result of a query on a database, the parameters used to generate the stored report comprise the parameters for the query itself. Additionally, or alternatively, the parameters used to generate the stored report may be extracted from the stored report itself. In another embodiment, the parameters used to generate the stored report may be stored separately from the report, yet retrievable using information contained in the report or using predetermined information. In yet another embodiment, the starting parameters for generating a report may be automatically determined and displayed to the user (using an interface such as that illustrated in FIG. 5E) to enable the parameters to be confirmed or revised (if needed) before the new report is generated.

Once the parameters used to generate the stored report are determined, the system generates a new report using the parameters (step 625), and presents the new report to the user (step 630), and the process ends. In the case where the report is the result of a query on a database, the system may generate the new report by running the query on the database, producing a new resulting report based on the information currently in the database. When the new report is generated, the user gets an updated version of the stored report without having to know and enter the information used to generate the stored report, such as the specific database and search query used to generate the report.

As will be appreciated by those skilled in the art, embodiments and features of the invention may be implemented through computer-hardware and/or software. Such embodiments may be implemented in various environments, such as personal computing, workstation, networked and other computing-based environments with one or more users, as highlighted above. The present invention, however, is not limited to such examples, and embodiments of the invention may be implemented with other platforms and in other environments.

By way of example, embodiments of the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage mediums and databases referred to herein symbolize elements that temporarily or permanently store data and instructions. Although storage functions may be provided as part of a computer, memory functions can also be implemented in a network, processors (e.g., cache, register), or elsewhere. While examples of databases have been provided herein, various types of storage mediums can be used to implemented features of the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments of the invention may also be embodied in computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infra-red (IR) link, a radio link, such as a Universal Mobile Telecommunications System (UMTS), Global System for Mobile Communication (GSM), Code Division Multiple Access (CDMA), or a satellite link.

Transmission protocols and data formats are also known, for example, as transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), etc. Such features may be utilized to implement embodiments of the present invention, as disclosed herein.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A computer-implemented method for searching and displaying reports to a user, the method comprising:
    displaying a list of objects;
    receiving a selection from the user of at least one object from the displayed list of objects;
    determining, based on the selected object, a list of report topics available for the selected object;
    displaying the list of report topics to the user;
    receiving a selection from the user of at least one report topic from the displayed list of report topics;
    automatically selecting, by a computer, an appropriate report from among a plurality of stored reports based on the selected report topic, user data access privileges of a user profile of the user, and report parameters of the user profile; and
    displaying the selected report to the user.

2. The computer-implemented method of claim 1, wherein determining an appropriate report further comprises:
    determining, based on a measurement of time since creation of a report, an appropriate report from the plurality of stored reports.

3. The computer-implemented method of claim 1, wherein displaying the appropriate report further comprises:
    displaying a portion of the appropriate report to the user, the portion determined using the user profile for the user.

4. The computer-implemented method of claim 1, wherein displaying the appropriate report further comprises:
    customizing a presentation of the appropriate report according to the user profile for the user; and
    displaying the appropriate report to the user according to the customized presentation.

5. The method of claim 1, wherein the report parameters comprise at least one of user information, organizational units for which the user is responsible, cost centers for which the user is responsible, profit centers for which the user is responsible, user preferred currency display, data for exclusion of certain account groups or cost elements, user valuation methods, and user display preferences.

6. A system for searching and displaying reports to a user, comprising:
    means for causing a display of a list of objects;
    means for receiving a selection of at least one object from the displayed list of objects;
    means for determining, based on the selected object, a list of report topics available for the selected object;
    means for causing a display of the list of report topics;
    means for receiving a selection of at least one report topic from the displayed list of report topics;
    means for automatically selecting an appropriate report from among a plurality of stored reports based on the selected report topic, user data access privileges of a user profile of the user, and report parameters of the user profile; and
    means for causing a display of the appropriate report to the user.

7. The system of claim 6, wherein the means for determining an appropriate report further comprises:
    means for determining, based on a measurement of time since creation of a report, an appropriate report from the plurality of stored reports.

8. The system of claim 6, wherein the means for causing a display of the appropriate report further comprises:
    means for causing the display of a portion of the appropriate report to the user, the portion determined using the user profile for the user.

9. The system of claim 6, wherein the means for causing the display of the appropriate report further comprises:
    means for customizing a presentation of the appropriate report according to the user profile for the user; and
    means for causing a display of the appropriate report to the user according to the customized presentation.

10. The system of claim 6, wherein the report parameters comprise at least one of user information, organizational units for which the user is responsible, cost centers for which the user is responsible, profit centers for which the user is responsible, user preferred currency display, data for exclusion of certain account groups or cost elements, user valuation methods, and user display preferences.

11. A computer readable medium storing a program for causing a computer to perform a method for searching and displaying reports to a user, the method comprising:
    providing information to display a list of objects;
    receiving a selection of at least one object from the displayed list of objects;
    determining, based on the selected object, a list of report topics available for the selected object;
    providing information to display the list of report topics;
    receiving a selection of at least one report topic from the displayed list of report topics;
    automatically selecting an appropriate report from among a plurality of stored reports based on the selected report topic, user data access privileges of a user profile of the user, and report parameters of the user profile; and
    providing information to display the appropriate report to the user.

12. The computer readable medium of claim 11, wherein determining an appropriate report further comprises:
    determining, based on a measurement of time since creation of a report, an appropriate report from the plurality of stored reports.

13. The computer readable medium of claim 11, wherein providing information to display the appropriate report further comprises:
    providing information to display a portion of the appropriate report to the user, the portion determined using the user profile for the user.

14. The computer readable medium of claim 11, wherein providing information to display the appropriate report further comprises:
    customizing a presentation of the appropriate report according to the user profile for the user; and
    providing information to display the appropriate report to the user according to the customized presentation.

15. The computer readable medium of claim 11, wherein the report parameters comprise at least one of user information, organizational units for which the user is responsible, cost centers for which the user is responsible, profit centers for which the user is responsible, user preferred currency display, data for exclusion of certain account groups or cost elements, user valuation methods, and user display preferences.

16. A computer-implemented method for displaying reports to a user, the method comprising:
   displaying a list of objects;
   receiving a selection of at least one object from the displayed list of objects;
   determining, based on the selected object, a list of report topics available for the selected object;
   displaying the list of report topics;
   receiving a selection of at least one report topic from the displayed list of report topics;
   automatically selecting, by a computer, an appropriate report from among a plurality of stored reports based on the selected report topic, user data access privileges of a user profile of the user, and report parameters of the user profile; and
   determining a set of parameters used to generate the appropriate report;
   generating a new report based on the set of parameters; and
   displaying the new report to the user.

17. The method of claim 16, wherein generating further comprises:
   generating a new report based on the set of parameters only if the appropriate report is out of date, and
   wherein displaying the new report further comprises:
   displaying the appropriate report to the user if the appropriate report is not out of date.

18. The method of claim 17, further comprising:
   presenting date information for the appropriate report to the user; and
   receiving input from the user indicating whether the appropriate report is out of date.

19. The method of claim 16, wherein determining an appropriate report further comprises:
   determining, based on a measurement of time since creation of a report, an appropriate report from the plurality of stored reports.

20. The method of claim 16, wherein displaying the new report further comprises:
   displaying a portion of the new report to the user, the portion determined using the user profile for the user.

21. The method of claim 16, wherein displaying the new report further comprises:
   customizing the presentation of the new report according to the user profile for the user; and
   displaying the new report to the user according to the customized presentation.

22. The method of claim 16, wherein the report parameters comprise at least one of user information, organizational units for which the user is responsible, cost centers for which the user is responsible, profit centers for which the user is responsible, user preferred currency display, data for exclusion of certain account groups or cost elements, user valuation methods, and user display preferences.

23. A system for displaying reports to a user, comprising:
   means for presenting a list of objects;
   means for receiving a selection of at least one object from the displayed list of objects;
   means for determining, based on the selected object, a list of report topics available for the selected object;
   means for presenting the list of report topics;
   means for receiving a selection of at least one report topic from the displayed list of report topics;
   means for automatically selecting an appropriate report from among a plurality of stored reports based on the selected report topic, user data access privileges of a user profile of the user, and report parameters of the user profile;
   means for determining a set of parameters used to generate the appropriate report;
   means for generating a new report based on the set of parameters; and
   means for presenting the new report to the user.

24. The system of claim 23, wherein the means for generating further comprises:
   means for generating a new report based on the set of parameters only if the appropriate report is out of date, and
   wherein the means for presenting the new report further comprises:
   means for presenting the appropriate report to the user if the appropriate report is not out of date.

25. The system of claim 24, further comprising:
   means for presenting date information for the appropriate report to the user; and
   means for receiving input from the user indicating whether the appropriate report is out of date.

26. The system of claim 23, wherein the means for determining an appropriate report further comprises:
   means for determining, based on a measurement of time since creation of a report, an appropriate report from the plurality of stored reports.

27. The system of claim 23, wherein the means for presenting the new report further comprises:
   means for presenting a portion of the new report to the user, the portion determined using the user profile for the user.

28. The system of claim 23, wherein the means for presenting the new report further comprises:
   means for customizing the presentation of the new report according to the user profile for the user; and
   means for presenting the new report to the user according to the customized presentation.

29. The system of claim 23, wherein the report parameters comprise at least one of user information, organizational units for which the user is responsible, cost centers for which the user is responsible, profit centers for which the user is responsible, user preferred currency display, data for exclusion of certain account groups or cost elements, user valuation methods, and user display preferences.

30. A computer readable medium storing a program for causing a computer to perform a method for displaying reports to a user, the method comprising:
   providing information for displaying a list of objects;
   receiving a selection of at least one object from the displayed list of objects;
   determining, based on the selected object, a list of report topics available for the selected object;
   providing information for displaying the list of report topics;
   receiving a selection of at least one report topic from the displayed list of report topics;
   automatically selecting an appropriate report from among a plurality of stored reports based on the selected report topic, user data access privileges of a user profile of the user, and report parameters of the user profile;
   determining a set of parameters used to generate the appropriate report;
   generating a new report based on the set of parameters; and providing information for displaying the new report to the user.

31. The computer readable medium of claim 30, wherein generating further comprises:
   generating a new report based on the set of parameters only if the appropriate report is out of date, and
   wherein providing information for displaying the new report further comprises:
   providing information for displaying the appropriate report to the user if the appropriate report is not out of date.

32. The computer readable medium of claim 31, further comprising:
   providing information for displaying date information for the appropriate report to the user; and
   receiving input from the user indicating whether the appropriate report is out of date.

33. The computer readable medium of claim 30, wherein determining an appropriate report further comprises:
   determining, based on a measurement of time since creation of a report, an appropriate report from the plurality of stored reports.

34. The computer readable medium of claim 30, wherein providing information for displaying the new report further comprises:
   providing information for displaying a portion of the new report to the user, the portion determined using the user profile for the user.

35. The computer readable medium of claim 30, wherein providing information for displaying the new report further comprises:
   customizing the presentation of the new report according to the user profile for the user; and
   providing information for displaying the new report to the user according to the customized presentation.

36. The computer readable medium of claim 30, wherein the report parameters comprise at least one of user information, organizational units for which the user is responsible, cost centers for which the user is responsible, profit centers for which the user is responsible, user preferred currency display, data for exclusion of certain account groups or cost elements, user valuation methods, and user display preferences.

37. A system for finding and presenting reports, comprising:
   a transmitter for sending signals containing information for displaying a list of objects, for displaying a list of report topics, and for displaying an appropriate report;
   a receiver for receiving signals containing information regarding an object selected by a user from the list of objects and a report topic selected by the user from the list of report topics;
   at least one data storage device containing a plurality of reports; and
   a processor, connected to the transmitter, the receiver, and the at least one data storage device, for automatically selecting an appropriate report from among a plurality of stored reports based on the selected report topic, user data access privileges of a user profile for the user, and report parameters of the user profile.

38. The system of claim 37, wherein the processor determines a set of parameters used to generate the appropriate report and generates a new report based on the set of parameters, and
   wherein the transmitter sends signals containing information for displaying the new report to the user.

39. A computer-implemented method for presenting a report to a user, comprising:
   receiving a report topic for an object;
   automatically selecting, by a computer, an appropriate report from among a plurality of stored reports that relates to the report topic for the object and complies with user data access privileges and report parameters of a user profile of the user;
   determining a plurality of parameters used to generate the report;
   generating a new report using the plurality of parameters; and
   presenting the new report to the user.

40. A system for presenting a report to a user, comprising:
   a receiver for receiving a signal containing information identifying a report topic for an object;
   a processor for automatically selecting an appropriate report from among a plurality of stored reports that relates to the report topic for the object and complies with user data access privileges and report parameters of a user profile of the user, for determining a plurality of parameters used to generate the report, and for generating a new report using the plurality of parameters; and
   a transmitter for transmitting a signal containing information for presenting the new report to the user.

41. A computer-implemented method for displaying reports to a user, the method comprising:
   determining at least one object based on a context of the user;
   determining a list of report topics related to the at least one object;
   presenting the list of report topics;
   receiving a selection of at least one report topic from the presented list of report topics;
   automatically selecting, by a computer, an appropriate an appropriate report from among a plurality of stored reports based on the selected report topic, user data access privileges of a user profile of the user, and report parameters of the user profile; and
   presenting the appropriate report to the user.

42. The computer-implemented method of claim 41, wherein the context is based on a data-processing task that the user is doing.

43. The computer-implemented method of claim 41, wherein the context is a computer-based event that affects the user.

44. The computer-implemented method of claim 41, wherein the context is the recent data-processing activities of the user.

45. The computer-implemented method of claim 41, wherein the context is selection of an object from a computer-displayed list of objects.

46. The computer-implemented method of claim 45, wherein the computer-displayed list of objects is generated by an application program for finding report objects.

47. The computer-implemented method of claim 45, wherein the computer-displayed list of objects is generated by a search engine.

48. The computer-implemented method of claim 45, wherein the computer-displayed list of objects is generated by a database manager.

49. A computer readable medium storing a program for causing a computer to perform a method for displaying reports to a user, the method comprising:
   determining at least one object based on a context of the user;
   determining a list of report topics related to the at least one object;
   presenting the list of report topics;

receiving a selection of at least one report topic from the presented list of report topics;

automatically selecting an appropriate report from among a plurality of stored reports based on the selected report topic, user data access privileges of a user profile of the user, and report parameters of the user profile; and presenting the appropriate report to the user.

50. The computer readable medium of claim 49, wherein the context is based on a data-processing task that the user is doing.

51. The computer readable medium of claim 49, wherein the context is a computer-based event that affects the user.

52. The computer readable medium of claim 49, wherein the context is the recent data-processing activities of the user.

53. The computer readable medium of claim 49, wherein the context is selection of an object from a computer-displayed list of objects.

54. The computer readable medium of claim 53, wherein the computer-displayed list of objects is generated by an application program for finding report objects.

55. The computer readable medium of claim 53, wherein the computer-displayed list of objects is generated by a search engine.

56. The computer readable medium of claim 53, wherein the computer-displayed list of objects is generated by a database manager.

57. A system for displaying reports to a user, comprising:
at least one processor programmed for determining at least one object based on a context of the user and determining a list of report topics related to the at least one object;

at least one transmitter for sending a signal containing information for presenting the list of report topics to the user;

a receiver for receiving a selection of at least one report topic from the presented list of report topics;

at least one processor programmed for automatically selecting an appropriate report from among a plurality of stored reports based on the selected report topic, user data access privileges of a user profile of the user, and report parameters of the user profile; and at least one transmitter for sending a signal containing information presenting the appropriate report to the user.

58. The system of claim 57, wherein the context is based on a data-processing task that the user is doing.

59. The system of claim 57, wherein the context is a computer-based event that affects the user.

60. The system of claim 57, wherein the context is the recent data-processing activities of the user.

61. The system of claim 57, wherein the context is selection of an object from a computer-displayed list of objects.

62. The system of claim 61, wherein the computer-displayed list of objects is generated by an application program for finding report objects.

63. The system of claim 61, wherein the computer-displayed list of objects is generated by a search engine.

64. The system of claim 61, wherein the computer-displayed list of objects is generated by a database manager.

\* \* \* \* \*

UNITED STATES PATENT AND TRADEMARK OFFICE
CERTIFICATE OF CORRECTION

PATENT NO.        : 7,624,341 B2                                        Page 1 of 1
APPLICATION NO. : 10/972679
DATED             : November 24, 2009
INVENTOR(S)       : Salmon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 675 days.

Signed and Sealed this

Twenty-sixth Day of October, 2010

David J. Kappos
*Director of the United States Patent and Trademark Office*